(12) United States Patent
Howard et al.

(10) Patent No.: US 11,870,386 B2
(45) Date of Patent: Jan. 9, 2024

(54) SYSTEM AND METHODS FOR CONTROLLING A POWER GENERATING ASSET HAVING A NON-DELIVERABLE COMPONENT OF A TOTAL POWER OUTPUT

(71) Applicant: General Electric Company, Schenectady, NY (US)

(72) Inventors: Dustin Howard, Brookhaven, GA (US); Alfredo Sebastian Achilles, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 67 days.

(21) Appl. No.: 17/504,584

(22) Filed: Oct. 19, 2021

(65) Prior Publication Data

US 2023/0122027 A1 Apr. 20, 2023

(51) Int. Cl.
*H02J 3/01* (2006.01)
*H02P 9/10* (2006.01)
*H02P 9/00* (2006.01)

(52) U.S. Cl.
CPC .............. *H02P 9/102* (2013.01); *H02P 9/007* (2013.01)

(58) Field of Classification Search
CPC ................................. H02P 9/007; H02P 9/102
See application file for complete search history.

(56) References Cited

U.S. PATENT DOCUMENTS 5,798,633 A 8/1998 Larsen et al.
7,119,452 B2 10/2006 Larsen
(Continued)

FOREIGN PATENT DOCUMENTS

CN 109494709 A 3/2019
EP 2523298 B1 11/2012
WO WO2015/131958 A1 9/2015

OTHER PUBLICATIONS

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.
(Continued)

*Primary Examiner* — Sean Gugger
(74) *Attorney, Agent, or Firm* — Dority & Manning, P.A.

(57) ABSTRACT

The system and method described herein provide control for a power generating asset having a double-fed generator connected to an electrical grid. Accordingly, a non-deliverable component and a deliverable component of a total power output of a generator of the power generating asset is determined via a controller. A compensation module of the controller then determines a first control signal based, at least in part, on the non-deliverable component. The first control signal is configured to establish a modified rotor current setpoint. Additionally, a buffer module of the controller then determines a buffer control signal for a DC energy buffer based, at least in part, on the non-deliverable component. The DC energy buffer is operably coupled between a line-side converter and a rotor-side converter of a power converter of the power generating asset. In response to the first control signal and the buffer control signal the non-deliverable component is delivered to the DC energy buffer via the line-side converter, thereby precluding the delivery of the non-deliverable component to or from the electrical grid. The deliverable component of the total power output of the generator is delivered to the electrical grid.

19 Claims, 5 Drawing Sheets

(56) References Cited

U.S. PATENT DOCUMENTS

| | | |
|---|---|---|
| 7,456,695 B2 | 11/2008 | Weng et al. |
| 7,804,184 B2 | 9/2010 | Yuan et al. |
| 9,270,194 B2 | 2/2016 | Brogan et al. |
| 9,467,082 B2 | 10/2016 | Garcia |
| 9,660,452 B2 | 5/2017 | Routimo |
| 9,660,453 B2 | 5/2017 | Majumder |
| 10,156,225 B2 | 12/2018 | Huang et al. |
| 2009/0200803 A1 | 8/2009 | Ichinose et al. |
| 2009/0206606 A1* | 8/2009 | Jorgensen ............. F03D 7/0224 290/44 |
| 2009/0278351 A1 | 11/2009 | Rivas et al. |
| 2010/0142237 A1 | 6/2010 | Yuan et al. |
| 2015/0008672 A1* | 1/2015 | Garcia .................... H02P 9/105 290/44 |
| 2016/0285252 A1* | 9/2016 | Burra ..................... F03D 9/255 |
| 2021/0010456 A1 | 1/2021 | Sanchez Navarro et al. |

OTHER PUBLICATIONS

EP Search Report for EP application No. 22201626.3, dated Mar. 3, 2023, 9 pages.

* cited by examiner

SYSTEM AND METHODS FOR CONTROLLING A POWER GENERATING ASSET HAVING A NON-DELIVERABLE COMPONENT OF A TOTAL POWER OUTPUT

FIELD

The present disclosure relates in general to power generation, and more particularly to systems and methods for controlling a power generating asset having a non-deliverable component of a total power output.

BACKGROUND

As disclosed herein, power generating assets may take a variety of forms and may include power generating assets which rely on renewable and/or nonrenewable sources of energy. Those power generating assets which rely on renewable sources of energy may generally be considered one of the cleanest, most environmentally friendly energy sources presently available. For example, wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to an electrical grid.

Wind turbines can be distinguished in two types: fixed speed and variable speed turbines. Conventionally, variable speed wind turbines are controlled as current sources connected to an electrical grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

As such, it may be desirable to operate asynchronous power generating assets, such as some wind turbines, as a grid-forming asset. Generally, grid-forming type converters may provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, the asynchronous power generating assets may share the burden of grid formation with other grid-forming sources, such as fossil-fuel-based generators, connected to the grid.

Many asynchronous power generating assets utilize grid-connected power converters to achieve certain dynamic control functions, including regulating speed, power, and mechanical loading of turbine components. For example, under rapidly changing wind conditions, the wind turbines may employ a grid connected power converter to help regulate the speed. This control function may change the active power that is injected into the electrical grid by the power generating asset. For example, in order to achieve the speed regulation function, the torque of the generator may be increased. This may, in turn, result in an increase in the total power output of the generator. In this way, the power needed to achieve the turbine control functions are directly coupled the power injected to the grid.

However, the changes in injected active power may interfere with required grid-forming functions when the power generating asset is operated as a grid-forming asset. Additionally, the changes in injected active power may be limited by grid constraints regardless of whether the power generating asset is operated as a grid-forming or grid-following asset. For example, during transient grid events, active power generation may be limited to prioritize reactive power for system voltage support. Additionally, power transfer limits of transmission systems may be constrained due to physical limits of the power transmission system or the loads connected to the grid. Accordingly, it may be desirable to achieve the dynamic control functions without changing the active power that is injected into electrical grid as a result thereof.

Thus, the present disclosure is directed to a system and method for controlling power generating assets having a non-deliverable component of a total power output to the electrical grid to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for controlling a power generating asset having a generator. The generator may be a double-fed generator having a stator operably coupled to a transformer and a rotor operably coupled to the transformer via a power converter. The method may include determining, via a controller of the power generating asset, a non-deliverable component and a deliverable component of a total power output of the generator. The method further includes determining, via a compensation module of the controller, a first control signal based, at least in part, on the non-deliverable component, the first control signal being configured to establish a modified rotor current set point. The method also includes determining, via a buffer control module of the controller, a buffer control signal for a DC energy buffer based, at least in part, on the non-deliverable component, the DC energy buffer being operably coupled between a line-side converter and a rotor-side converter of the power converter. Moreover, the method includes precluding delivery of the non-deliverable component to an electrical grid by delivering the non-deliverable component to or from the DC energy buffer via the line-side converter in response to the first control signal and the buffer control signal. Thus, the method also includes delivering the deliverable component of the total power output of the generator to the electrical grid.

In another aspect, the present disclosure is directed to a system for operating a power generating asset so as to provide grid forming control. The system may include a double-fed generator connected to an electrical grid, and a controller communicatively coupled to the power converter. The controller may include at least one processor and a plurality of modules configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
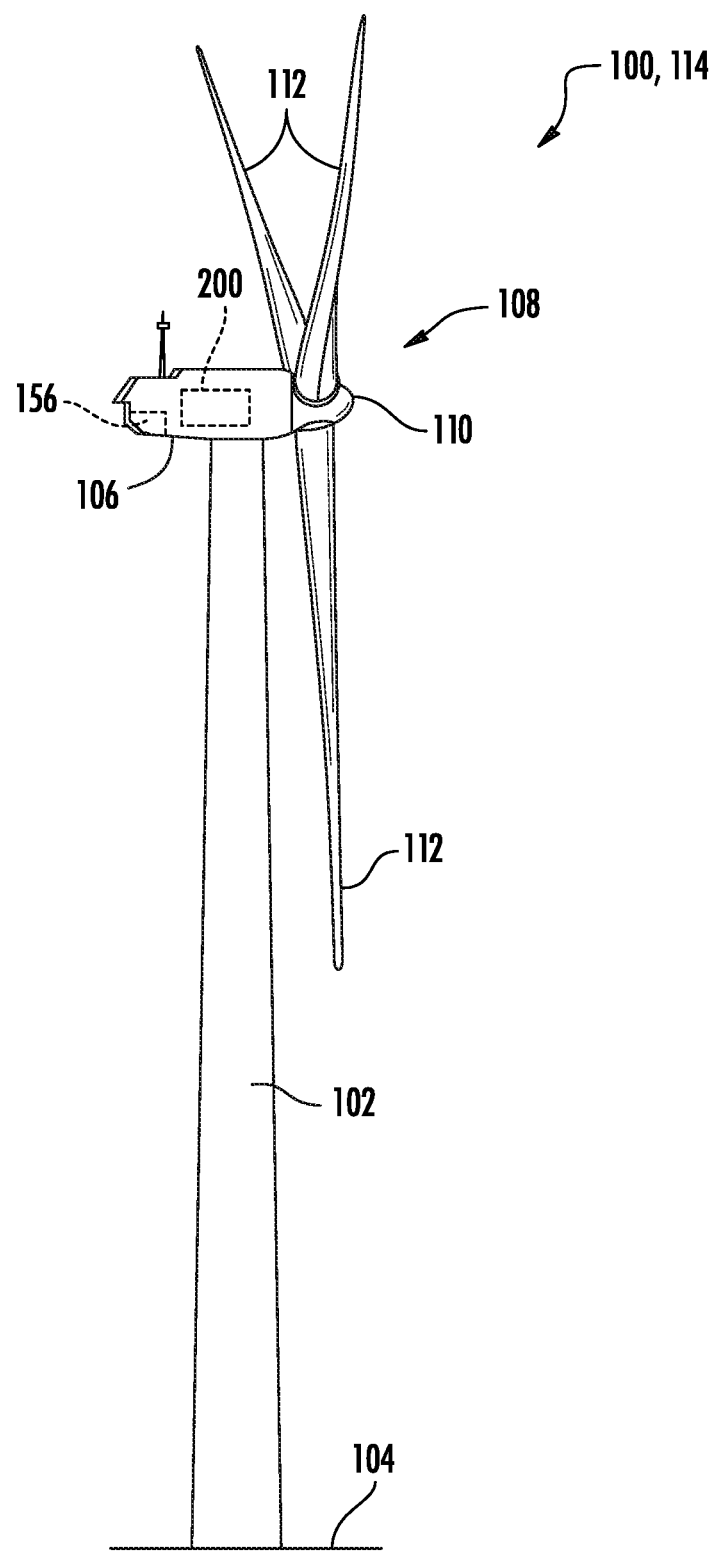
FIG. 1 illustrates a perspective view of one embodiment of a power generating asset configured as a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a power generating asset, such as a wind turbine, connected to an electrical grid. In particular, the systems and methods disclosed herein may be employed to achieve certain dynamic control functions while reducing or minimizing the change in active power delivered to the electrical grid. For example, generator torque may be increased during a low-voltage ride through event in order to reduce or minimize changes in rotor speed caused by the grid fault. This increase in generator torque may result in an increase in the active power delivered to the electrical grid, which can have a negative impact on grid stability. However, the systems and methods disclosed herein may facilitate the utilization of generator torque to reduce impacts of grid events on the drivetrain of the power generating asset without resulting in a corresponding change (e.g., increase) in the magnitude of the active power delivered to the electrical grid. In other words, the systems and methods described herein may decouple control of drivetrain shaft power from the amount of active power injected into the electrical grid. This may, in turn, permit the power generating asset to manage loading on the drivetrain independent of grid constraints. It should be appreciated that such a decoupling of the drivetrain shaft power from the active power injected into the electrical grid may be desirable in both grid-following and grid-forming applications.

By way of illustration, when the power generating asset is connected to a very weak grid, the power that can be injected into the grid is constrained by the impedance of the grid and the loads within the system. During certain events, the wind turbine may need to rapidly increase or decrease the torque of the generator to appropriately control speed and loading on the mechanical components of the drivetrain. Examples of these types of events include the short time window following grid faults or very high wind events. During these events, the physical power constraints imposed by the grid may be not allow the wind turbine to change power enough to manage loading on the wind turbine. In these circumstances, the wind turbine may lose control of rotor speed or torque and will be required to shut down. However, by decomposing the power needs of the drivetrain into deliverable and non-deliverable components, the risks of this shutdown are reduced since a non-deliverable component can be used to manage the torque/power needs of the turbine despite the constraints of the grid. Accordingly, the non-deliverable component of the total power output may be delivered to/from a DC energy buffer. The DC energy buffer may be a component of a converter of the power generating asset. The non-deliverable component may then be dissipated and/or stored. When stored, the non-deliverable component may be utilized to further support operations of the power generating asset.

Referring now to the drawings, FIG. 1 illustrates a perspective view of one embodiment of a power generating asset 100 according to the present disclosure. As shown, the power generating asset 100 may be configured as a wind turbine 114. In an additional embodiment, the power generating asset 100 may, for example, be configured as a solar power generating asset, a hydroelectric plant, a fossil fuel generator, and/or a hybrid power generating asset.

When configured as a wind turbine 114, the power generating asset 100 may generally include a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 400 (FIG. 2) positioned within the nacelle 106 to permit electrical energy to be produced.

The wind turbine 114 may also include a controller 200 centralized within the nacelle 106. However, in other embodiments, the controller 200 may be located within any other component of the wind turbine 114 or at a location outside the wind turbine. Further, the controller 200 may be communicatively coupled to any number of the components of the wind turbine 114 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
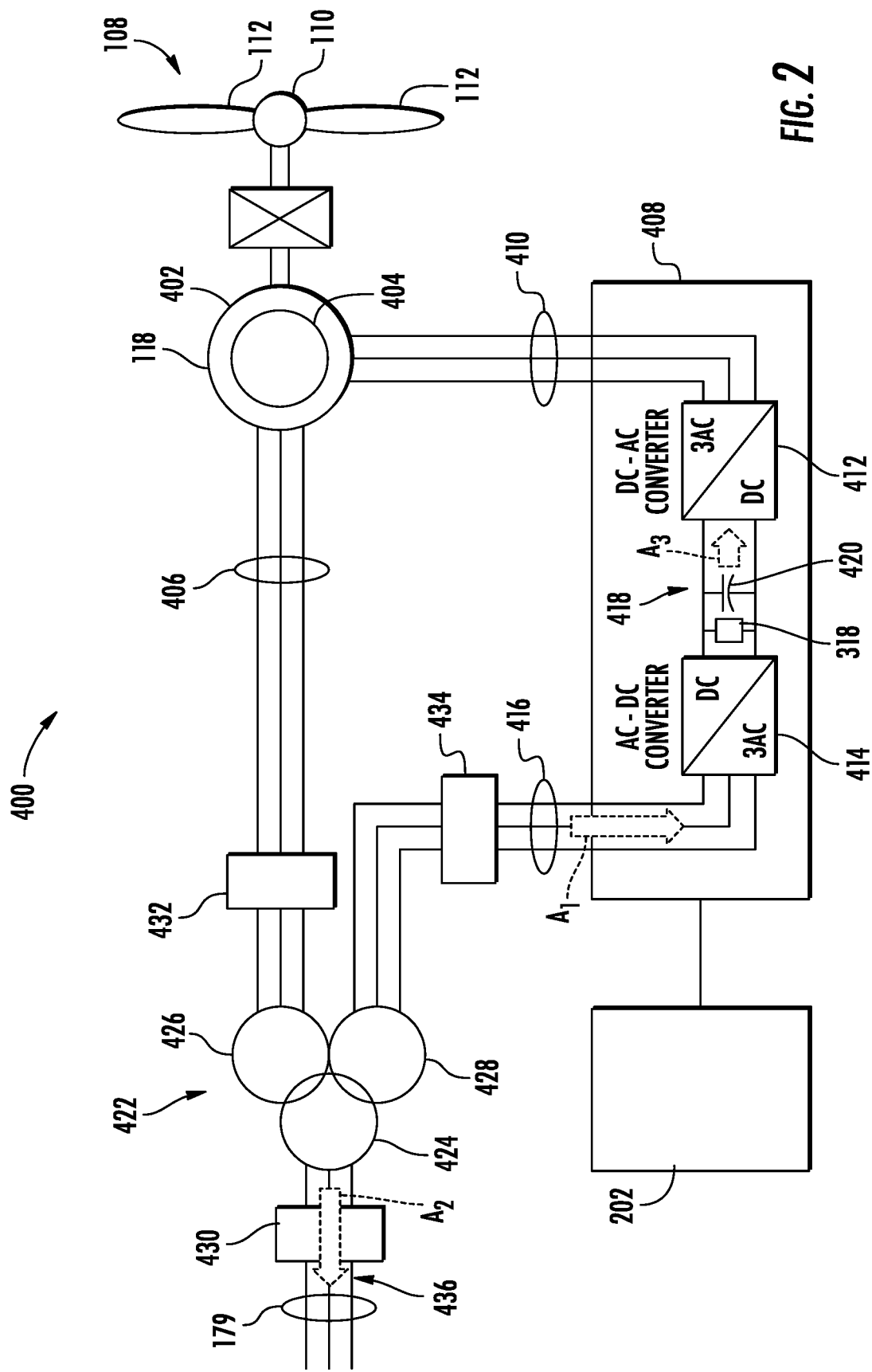
FIG. 2 illustrates a schematic diagram of one embodiment of an electrical system for use with the power generating asset according to the present disclosure.

Referring now to FIG. 2, wherein an exemplary electrical system 400 of the power generating asset 100 is illustrated. As shown, the generator 118 may be coupled to the rotor 108 for producing electrical power from the rotational energy generated by the rotor 108. Accordingly, in an embodiment, the electrical system 400 may include various components for converting the kinetic energy of the rotor 108 into an electrical output in an acceptable form to a connected power grid 179. For example, in an embodiment, the generator 118 may be a double-fed induction generator (DFIG) having a stator 402 and a generator rotor 404. The generator 118 may be coupled to a stator bus 406 and a power converter 408 via a rotor bus 410. In such a configuration, the stator bus 406 may provide an output multiphase power (e.g. three-phase power) from a stator of the generator 118, and the rotor bus 410 may provide an output multiphase power (e.g. three-phase power) of the generator rotor 404 of the generator 118. Additionally, the generator 118 may be coupled via the rotor bus 410 to a rotor side converter 412. The rotor side converter 412 may be coupled to a line-side converter 414 which, in turn, may be coupled to a line-side bus 416.

In an embodiment, the rotor side converter 412 and the line-side converter 414 may be configured for normal operating mode in a three-phase, pulse width modulation (PWM) arrangement using insulated gate bipolar transistors (IGBTs) as switching devices 438. Other suitable switching devices may be used, such as insulated gate commuted thyristors, MOSFETs, bipolar transistors, silicone-controlled rectifiers, and/or other suitable switching devices. The rotor side converter 412 and the line-side converter 414 may be coupled via a DC link 418 across a DC link capacitor 420.

In an embodiment, the power converter 408 may be coupled to the controller 200 configured as a converter controller 202 to control the operation of the power converter 408. For example, the converter controller 202 may send control commands to the rotor side converter 412 and the line-side converter 414 to control the modulation of switching elements used in the power converter 408 to establish a desired generator torque setpoint and/or power output.

As further depicted in FIG. 2, the electrical system 400 may, in an embodiment, include a transformer 422 coupling the power generating asset of 100 to the electrical grid 179 via a point of interconnect (POI) 436. The transformer 422 may, in an embodiment, be a 3-winding transformer which includes a high voltage (e.g., greater than 12 KVAC) primary winding 424. The high voltage primary winding 424 may be coupled to the electrical grid 179. The transformer 422 may also include a medium voltage (e.g., 6 KVAC) secondary winding 426 coupled to the stator bus 406 and a low voltage (e.g., 575 VAC, 690 VAC, etc.) auxiliary winding 428 coupled to the line bus 416. It should be appreciated that the transformer 422 can be a three-winding transformer as depicted, or alternatively, may be a two-winding transformer having only a primary winding 424 and a secondary winding 426; may be a four-winding transformer having a primary winding 424, a secondary winding 426, and auxiliary winding 428, and an additional auxiliary winding; or may have any other suitable number of windings.

In an embodiment, the electrical system 400 may include various protective features (e.g., circuit breakers, fuses, contactors, and other devices) to control and/or protect the various components of the electrical system 400. For example, the electrical system 400 may, in an embodiment, include a grid circuit breaker 430, a stator bus circuit breaker 432, and/or a line bus circuit breaker 434. The circuit breaker(s) 430, 432, 434 of the electrical system 400 may connect or disconnect corresponding components of the electrical system 400 when a condition of the electrical system 400 approaches a threshold (e.g., a current threshold and/or an operational threshold) of the electrical system 400.

As depicted in FIG. 1, in an embodiment, the power generating asset 100 may include at least one operational sensor 156. The operational sensor(s) 156 may be configured to detect a performance of the power generating asset 100, e.g., in response to the environmental condition. In an embodiment, the operational sensor(s) 156 may be configured to monitor a plurality of electrical conditions, such as slip, stator voltage and current, rotor voltage and current, line-side voltage and current, DC-link charge and/or any other electrical condition of the power generating asset.

It should also be appreciated that, as used herein, the term "monitor" and variations thereof indicates that the various sensors of the power generating asset 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the power generating asset 100.

Figure 3:
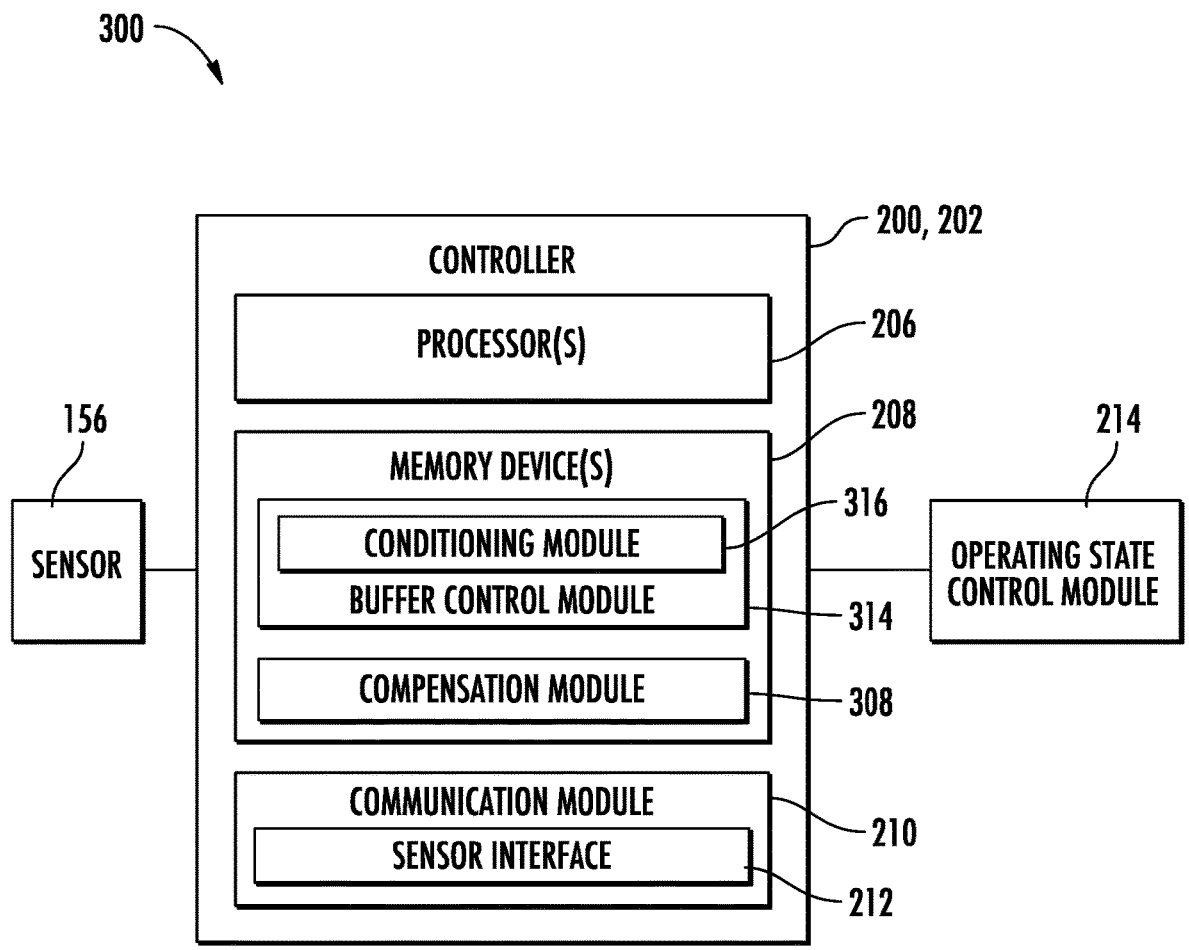
FIG. 3 illustrates a block diagram of one embodiment of a controller for use with the power generating asset according to the present disclosure.
Figure 4:
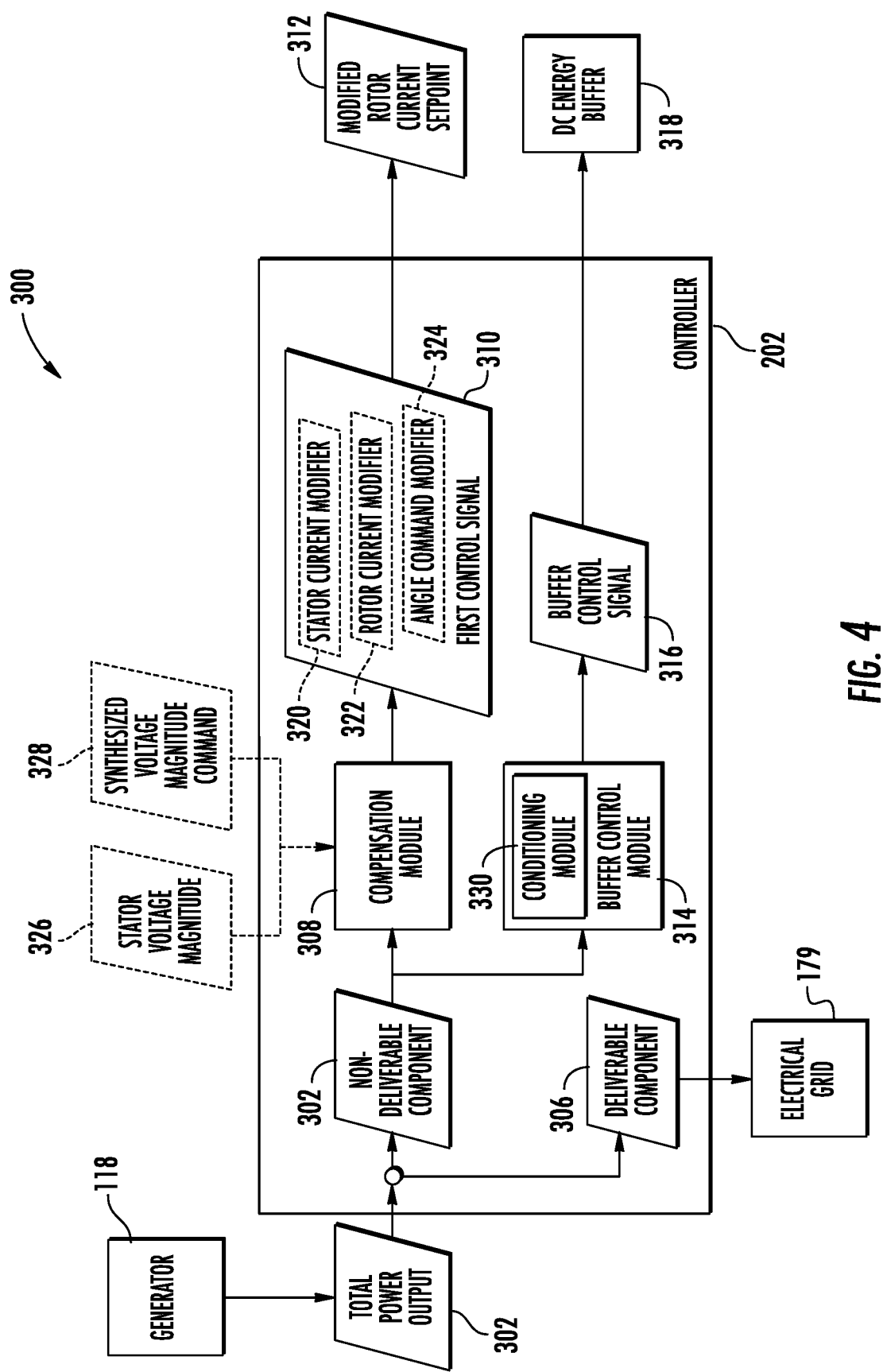
FIG. 4 illustrates a control architecture for one embodiment of a control logic for operating the power generating asset according to the present disclosure.

Referring to FIGS. 2-4, multiple embodiments of a system 300 for controlling the power generating asset 100 according to the present disclosure are presented. As shown particularly in FIG. 3, a schematic diagram of one embodiment of suitable components that may be included within the system 300 is illustrated. For example, as shown, the system 300 may include the controller 200 communicatively coupled to the sensor(s) 156. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the power generating asset 100. Further, the communications module 210 may include a sensor interface 212 (e.g., one or more analog-to-digital converters) to permit signals transmitted from the sensor(s) 156 to be converted into signals that can be understood and processed by the processors 206. It should be appreciated that the sensor(s) 156 may be communicatively coupled to the communications module 210 using any suitable means. For example, the sensor(s) 156 may be coupled to the sensor interface 212 via a wired connection. However, in other embodiments, the sensor(s) 156 may be coupled to the sensor interface 212 via a wireless connection, such as by using any suitable wireless communications protocol known in the art. Additionally, the communications module 210 may also be operably coupled to an operating state control module 214 configured to change at least one turbine operating state of the power generating asset 100, such as an operating state of the generator 118.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions as described herein, as well as various other suitable computer-implemented functions.

As disclosed herein, in an embodiment the system 300 may be configured to control a component of power flow in the stator 402 of the generator 118 without changing the magnitude of the power injected into the electrical grid 179 in grid-forming and/or grid-following applications. This may be accomplished by diverting a portion of the power generated by the generator 118 away from the electrical grid 179. Accordingly, the controller 200 may determine a non-deliverable component 302 of the total power output 304 of the generator 118. Additionally, the controller 200 may determine a deliverable component 306 of the total power output 304 of the generator 118. The total power output 304 may reflect the total power developed by the generator stator 402 and the generator rotor 404. The deliverable component 306 of the total power output 304 may correspond to a maximal active power magnitude that may be consistent with grid constraints and/or grid-forming considerations. The non-deliverable component 302 may correspond to a portion of the total power output 304 that is developed by the generator 118 in response to a torque setpoint that corresponds to a dynamic control function.

This non-deliverable component 302 may be necessary to achieve certain performance of the mechanical system of the wind turbine, but grid constraints restrict this component from being realized by changes of power injected into the grid. This non-deliverable component may be related to excessive power of the turbine that exceeds the grid constraints, thereby making the non-deliverable component of power a positive value. Alternatively, the non-deliverable component may be related to insufficient ability to reduce the power to the grid (due system loads), thereby resulting in a non-deliverable component of power that is negative.

In order to control the power generating asset 100 when the total power output 304 has a non-deliverable component 302, the converter controller 202 may utilize a compensation module 308 to determine a first control signal 310. The first control signal 310 may be configured to establish a modified rotor current setpoint 312. The converter controller 202 may also, in an embodiment, utilize a buffer control module 314 to determine a buffer control signal 316 for a DC energy buffer 318. The first control signal 310 and/or the buffer control signal 316 may be based, at least in part, on the non-deliverable component 302 and may, in an embodiment, be determined simultaneously. The DC energy buffer 318 may be operably coupled between the line-side converter 414 and the rotor-side converter 412 of the power converter 408. Accordingly, the system 300 may preclude delivery of the non-deliverable component 302 to the electrical grid 179 by delivering (as indicated by arrow $A_1$) the non-deliverable component 302 to the energy buffer 318. In an embodiment, the delivery of the non-deliverable component 302 to the DC energy buffer 318 may be via the line-side converter 414. The delivery of the non-deliverable component 302 to the DC energy buffer 318 may be accomplished in response to the first control signal 310 and the buffer control signal 316. With the non-deliverable component 302 being diverted to the DC energy buffer 318, the deliverable component 306 of the total power output 304 of the generator 118 may be delivered (as indicated by arrow $A_2$) to the electrical grid 179.

In an embodiment, the non-deliverable component 302 may include a portion of the total power output 304 of the generator 118 that exceeds an active power delivery limit. The active power delivery limit may, for example, correspond to a constraint imposed by grid codes and or physics-based constraints of the power generating asset 100, the electrical grid 179, and/or the transmission system connected therebetween. In other words, the non-deliverable component 302 may be a component of stator power that is not intended for injection into the electrical grid 179 but is nevertheless generated during the execution of a dynamic control function. According to the present disclosure, this component of stator power may be diverted from the electrical grid 179 to the DC energy buffer 318.

The power generating asset 100 may, in an embodiment, be configured as a grid-following power generating asset 100. In such an embodiment, the first control signal 310 may be a stator current modifier 320. Similarly, in an embodiment, the first control signal 310 may be a rotor current modifier 322. The stator current modifier 320 and/or the rotor current modifier 322 may be configured to develop a desired change in the stator power output.

The power generating asset 100 may, in an embodiment, be configured as a grid-forming power generating asset 100. Applications to grid-forming control for a double-fed wind turbine generator are disclosed in PCT/US2020/013787 entitled "System and Method for Providing Grid-Forming Control for a Double-Fed Wind Turbine Generator," which is incorporated herein for all purposes.

When the power generating asset 100 is configured as a grid-forming power generating asset 100, the first control signal 310 may be an angle command modifier 324. The angle command modifier 324 may be configured to alter a desired voltage angle command so as to develop a desired change in the stator power output.

In order to determine the angle command modifier 324, the compensation module 308 may, in an embodiment, receive a stator voltage magnitude feedback 326 and a synthesized voltage magnitude command 328. The compensation module 308 may then determine a product of the non-deliverable component 302 and a reactance. (The reactance may be a reactance from a PLL reference node to voltage synthesized within the generator 118.) This product may then be divided by a product of the stator voltage magnitude feedback 326 and the synthesized voltage magnitude command 328 via the compensation module 308 in order to determine a quotient. The compensation module 308 may determine the angle command modifier 324 (e.g., the first control signal 310) as an arcsin of the quotient.

As depicted in FIGS. 2 and 4, in an embodiment, the buffer control module 314 may include a conditioning module 330. The conditioning module 330 may be configured to manage different components of the non-deliverable component 302.

In order to determine the buffer control signal 316, the conditioning module 330 may, in an embodiment filter the non-deliverable component 302. In another embodiment, the conditioning module may sum multiple different components of the non-deliverable component 302.

In an embodiment, the conditioning module 330 may apply a dynamic gain to the filtered non-deliverable component. Applying the dynamic gain may compensate for an inherent transfer function between the first control signal 310 and the change in stator active power output.

In an additional embodiment, the conditioning module 330 may apply at least one limit to the buffer control signal 316. The limit(s) may, for example, be based on a maximum and/or minimum rating of a component of the power generating asset 100 for example, the conditioning module 330 may utilize the limit to respect equipment ratings for the line-side converter 414, the stator 402, the rotor 404, and/or the DC energy buffer 318. It should be appreciated that the limit(s) may be a dynamic limit that changes based on the nominal active power, reactive power, and voltage operating point of the generator 118. In other words, in an embodiment, the limit(s) may vary in accordance with an active power operating point, a reactive power operating point, and/or a voltage operating point of the generator 118.

In an embodiment, the DC energy buffer 318 may be a resistive element. In such an embodiment, the DC energy buffer 318 may absorb and/or dissipate the non-deliverable component 302. For example, the non-deliverable component 302 may convert at least a portion of the non-deliverable component 302 into heat.

In an additional embodiment, the DC energy buffer 318 may be configured as an energy storage device. In such an embodiment, the DC energy buffer 318 may store at least a portion of the non-deliverable component 302. The stored portion may then be available to support operations of the power generating asset 100. For example, the stored portion may, in an embodiment, be delivered (as depicted by arrow $A_3$) from the DC energy buffer 318 to the rotor side converter 412. In such an embodiment, the non-deliverable component 302 may correspond to a power circulated (via arrows $A_2$ and $A_3$) between the stator 402 and the DC energy buffer 318. The non-deliverable component 302 may, for example, be circulated between the stator 402 and the DC energy buffer 318 during a grid fault event (e.g., a low-voltage event, a zero-voltage event, and/or a high-voltage event) and/or a recovery therefrom. It should be appreciated that the circulation of the non-deliverable component 302 may facilitate continued operation and/or recovery of the power generating asset 100 in the presence of the grid fault event.

In an embodiment, the first control signal 310 may be one of a plurality of control signals 310. Additionally, in an embodiment the buffer control signal 316 may be one of a plurality of buffer control signals 316. The pluralities of control signals 310 and the pluralities of buffer control signals 316 may be configured to address different components of the non-deliverable component 302. In such an embodiment, the converter controller 202 may utilize the compensation module 308 to determine a consolidated first control signal by summing each first control signal 310 of the plurality of first control signals 310. Additionally, the converter controller 202 may utilize the buffer control module 314 to determine a consolidated buffer control signal by summing each buffer control signal 316 of the plurality of buffer control signals 316.

Figure 5:
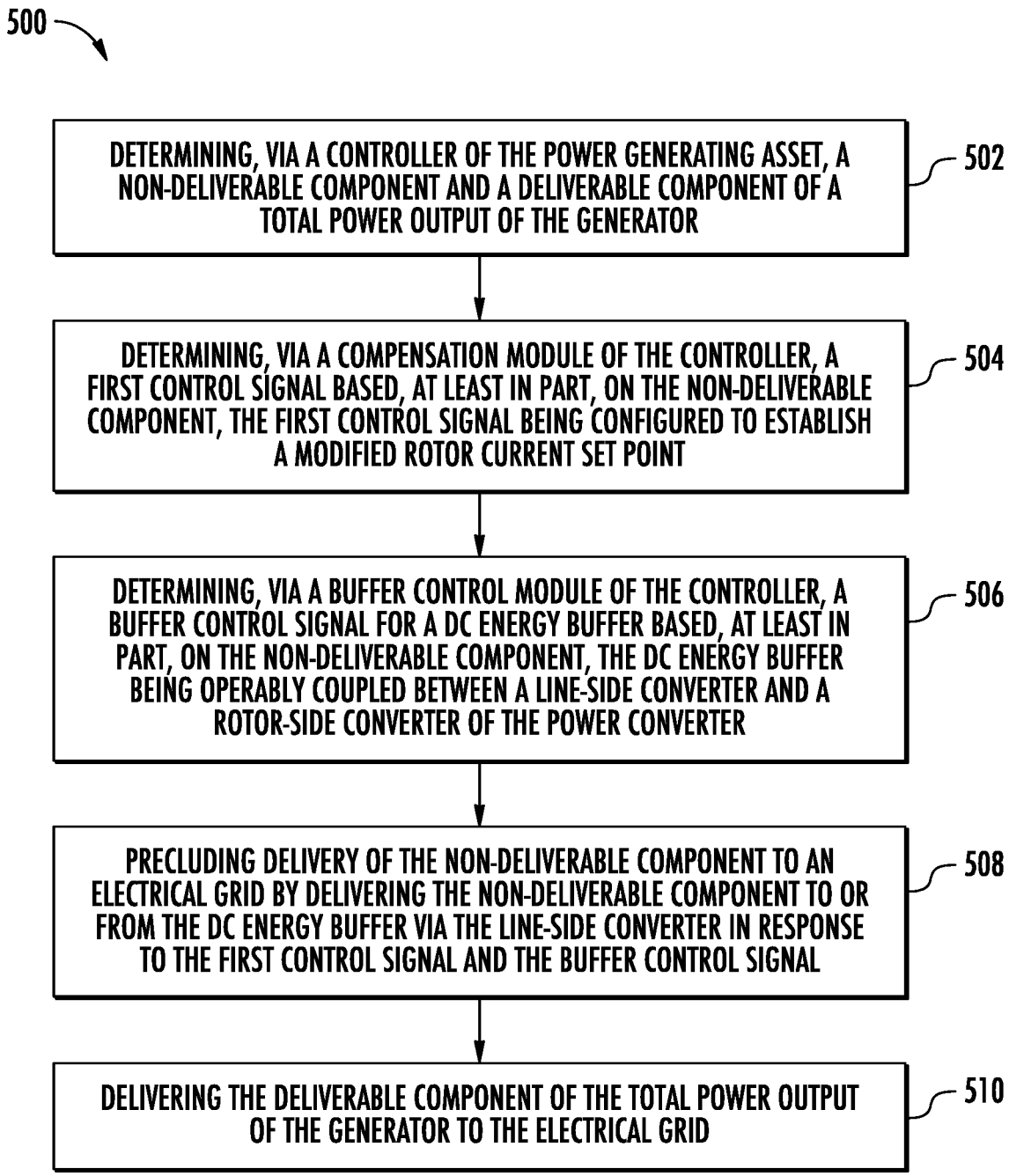
FIG. 5 illustrates a flow diagram of one embodiment of a method for controlling a power generating asset via the control architecture of FIG. 4 according to the present disclosure.

Referring now to FIG. 5, a flow diagram of one embodiment of a method 500 for controlling the power generating asset is presented. The method 500 may be implemented using, for instance, the system 300 of the present disclosure discussed above with references to FIGS. 2-4 to divert the non-deliverable component of the total power output of the generator. FIG. 5 depicts steps performed in a particular order for purposes of illustration and discussion. Those of ordinary skill in the art, using the disclosures provided herein, will understand that various steps of the method 500, or any of the methods disclosed herein, may be adapted, modified, rearranged, performed simultaneously, or modified in various ways without deviating from the scope of the present disclosure.

As shown at (502), the method 500 may include determining, via a controller of the power generating asset, a non-deliverable component and a deliverable component of a total power output of the generator. As shown at (504), the method 500 may include determining, via a compensation module of the controller, a first control signal based, at least in part, on the non-deliverable component. The first control signal may be configured to establish a modified rotor current set point. As shown at (506), the method 500 may include determining, via a buffer control module of the controller, a buffer control signal for a DC energy buffer based, at least in part, on the non-deliverable component.

The DC energy buffer may be operably coupled between a line-side converter and a rotor-side converter of the power converter of the power generating asset. As shown at (508), the method 500 may include precluding delivery of the non-deliverable component to an electrical grid by delivering the non-deliverable component to the DC energy buffer via the line-side converter in response to the first control signal and the buffer control signal. Additionally, as shown at (510), the method 500 may include delivering the deliverable component of the total power output of the generator to the electrical grid.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Further aspects of the invention are provided by the subject matter of the following clauses:

Clause 1. A method for controlling a power generating asset having a generator, the generator being a double-fed generator having a stator operably coupled to a transformer and a rotor operably coupled to the transformer via a power converter, the method comprising:
  determining, via a controller of the power generating asset, a non-deliverable component and a deliverable component of a total power output of the generator;
  determining, via a compensation module of the controller, a first control signal based, at least in part, on the non-deliverable component, the first control signal being configured to establish a modified rotor current set point;
  determining, via a buffer control module of the controller, a buffer control signal for a DC energy buffer based, at least in part, on the non-deliverable component, the DC energy buffer being operably coupled between a line-side converter and a rotor-side converter of the power converter;
  precluding delivery of the non-deliverable component to an electrical grid by delivering the non-deliverable component to or from the DC energy buffer via the line-side converter in response to the first control signal and the buffer control signal; and
  delivering the deliverable component of the total power output of the generator to the electrical grid.

Clause 2. The method of clause 1, wherein the non-deliverable component comprises a portion of the total power output of the generator which exceeds an active power delivery limit.

Clause 3. The method of any of the preceding clauses, further comprising determining the first control signal and the buffer control signal simultaneously.

Clause 4. The method of clause 3, wherein the power generating asset is configured as a grid-following power generating asset and wherein the first control signal is a stator or rotor current modifier configured to develop a desired change in a stator power output.

Clause 5. The method of clauses 3-5, wherein the power generating asset is configured as a grid-forming power generating asset and wherein the first control signal is an angle command modifier configured to alter a desired voltage angle command so as to develop a desired change in a stator power output.

Clause 6. The method of clause 5, wherein determining the angle command modifier further comprises:
  receiving, via the compensation module, a stator voltage magnitude feedback and a synthesized voltage magnitude command;
  determining, via the compensation module, a quotient of a product of the non-deliverable component and a reactance divided by a product of the stator voltage magnitude feedback and the synthesized voltage magnitude command; and
  determining, via the compensation module, the angle command modifier as an arcsine of the quotient.

Clause 7. The method of clauses 3-6, wherein the buffer control module further comprises a conditioning module.

Clause 8. The method of clause 7, wherein determining the buffer control signal further comprises:
  filtering, via the conditioning module, the non-deliverable component;
  applying, via the conditioning module, a dynamic gain to the filtered non-deliverable component in order to compensate for an inherent transfer function between the first control signal and a change in stator active power output; and
  applying, via the conditioning module, at least one limit to the buffer control signal based on a maximum or minimum rating of a component of the power generating asset.

Clause 9. The method of clause 8, wherein the at least one limit is a dynamic limit that varies in accordance with at least one of an active power operating point, a reactive power operating point, or a voltage operating point of the generator.

Clause 10. The method of clauses 3-9, wherein the DC energy buffer is a resistive element.

Clause 11. The method of clauses 3-10, wherein the DC energy buffer is an energy storage device.

Clause 12. The method of clause 11, further comprising:
  delivering at least a portion of the non-deliverable component from the DC energy buffer to the rotor side converter.

Clause 13. The method of any of the preceding clauses, wherein the non-deliverable component corresponds to a power circulated between the stator and DC energy buffer during a grid fault event.

Clause 14. The method of any of the preceding clauses, wherein the first control signal is one of a plurality of first control signals, wherein the buffer control signal is one of a plurality of buffer control signals, wherein the pluralities of control signals and the pluralities of buffer control signals are configured to address different components of the non-deliverable component, the method further comprising:
  determining, via the compensation module, a consolidated first control signal by summing each first control signal of the plurality of first control signals; and
  determining, via the buffer control module, a consolidated buffer control signal by summing each buffer control signal of the plurality of buffer control signals.

Clause 15. The method of any of the preceding clauses, wherein the power generating asset is a wind turbine.

Clause 16. A system for operating power generating asset, the system comprising:
   a double-fed generator connected to a power grid; and
   a controller communicatively coupled to the generator, the controller comprising at least one processor and a plurality of modules configured to perform a plurality of operations, the plurality of operations comprising:
      determining a non-deliverable component and a deliverable component of a total power output of the generator,
      determining, via a compensation module of the controller, a first control signal based, at least in part, on the non-deliverable component, the first control signal being configured to establish a modified rotor current set point,
      determining, via a buffer control module of the controller, a buffer control signal for a DC energy buffer based, at least in part, on the non-deliverable component, the DC energy buffer being operably coupled between a line-side converter and a rotor-side converter of the power converter,
      precluding delivery of the non-deliverable component to an electrical grid by delivering the non-deliverable component to the DC energy buffer via the line-side converter in response to the first control signal and the buffer control signal, and
      delivering the deliverable component of the total power output of the generator to the electrical grid.

Clause 17. The system of clause 16, wherein the non-deliverable component comprises a portion of the total power output of the generator which exceeds an active power delivery limit, and wherein the plurality of operations further comprise:
   determining the first control signal and the buffer control signal simultaneously.

Clause 18. The system of clause 17, wherein the power generating asset is configured as a grid-forming power generating asset and wherein the first control signal is an angle command modifier configured to alter a desired voltage angle command so as to develop a desired change in a stator power output, and wherein determining the first control signal further comprises:
   receiving, via the compensation module, a stator voltage magnitude feedback and a synthesized voltage magnitude command;
   determining, via the compensation module, a quotient of a product of the non-deliverable component and a reactance divided by a product of the stator voltage magnitude feedback and the synthesized voltage magnitude command; and
   determining, via the compensation module, the first control signal as an arcsine of the quotient.

Clause 19. The system of clause 18, wherein the buffer control module further comprises a conditioning module, and wherein determining the buffer control signal further comprises:
   filtering, via the conditioning module, the non-deliverable component;
   applying, via the conditioning module, a dynamic gain to the filtered non-deliverable component in order to compensate for an inherent transfer function between the first control signal and the change in stator active power output; and
   applying, via the conditioning module, at least one limit to the buffer control signal based on a maximum or minimum rating of a component of the power generating asset.

Clause 20. The system of clauses 16-19, wherein the DC energy buffer is one of a resistive element or an energy storage device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a power generating asset having a generator, the generator being a double fed generator having a stator operably coupled to a transformer and a rotor operably coupled to the transformer via a power converter, the method comprising:
   determining, via a controller of the power generating asset, a non deliverable component and a deliverable component of a total power output of the generator;
   determining, via a compensation module of the controller, a first control signal based, at least in part, on the non deliverable component, the first control signal being configured to establish a modified rotor current set point;
   determining, via a buffer control module of the controller, a buffer control signal for a DC energy buffer based, at least in part, on the non deliverable component, the DC energy buffer being operably coupled between a line side converter and a rotor side converter of the power converter, wherein determining the buffer control signal further comprises:
      filtering, via a conditioning module of the buffer control module, the non deliverable component; and
      applying, via the conditioning module, at least one limit to the buffer control signal based on a maximum rating or a minimum rating of a component of the power generating asset;
   precluding delivery of the non deliverable component to an electrical grid by delivering the non deliverable component to the DC energy buffer via the line side converter in response to the first control signal and the buffer control signal; and
   delivering the deliverable component of the total power output of the generator to the electrical grid.

2. The method of claim 1, wherein the non deliverable component comprises a portion of the total power output of the generator which exceeds an active power delivery limit.

3. The method of claim 1, further comprising determining the first control signal and the buffer control signal simultaneously.

4. The method of claim 3, wherein the power generating asset is configured as a grid following power generating asset and wherein the first control signal is a stator or rotor current modifier configured to develop a desired change in a stator power output.

5. The method of claim 3, wherein the power generating asset is configured as a grid forming power generating asset and wherein the first control signal is an angle command modifier configured to alter a desired voltage angle command so as to develop a desired change in a stator power output.

6. The method of claim 5, wherein determining the angle command modifier further comprises:
- receiving, via the compensation module, a stator voltage magnitude feedback and a synthesized voltage magnitude command;
- determining, via the compensation module, a quotient of a product of the non deliverable component and a reactance divided by a product of the stator voltage magnitude feedback and the synthesized voltage magnitude command; and
- determining, via the compensation module, the angle command modifier as an arcsine of the quotient.

7. The method of claim 3, wherein the buffer control module further comprises a conditioning module.

8. The method of claim 7, wherein determining the buffer control signal further comprises:
- applying, via the conditioning module, a dynamic gain to the non-deliverable component to compensate for an inherent transfer function between the first control signal and a change in stator active power output.

9. The method of claim 1, wherein the at least one limit is a dynamic limit that varies in accordance with at least one of an active power operating point, a reactive power operating point, or a voltage operating point of the generator.

10. The method of claim 3, wherein the DC energy buffer is a resistive element.

11. The method of claim 3, wherein the DC energy buffer is an energy storage device.

12. The method of claim 11, further comprising:
- delivering at least a portion of the non deliverable component from the DC energy buffer to the rotor side converter.

13. The method of claim 1, wherein the non deliverable component corresponds to a power circulated from the stator to the DC energy buffer during a grid fault event.

14. The method of claim 1, wherein the power generating asset is a wind turbine.

15. A system for operating power generating asset, the system comprising:
- a double fed generator connected to a power grid; and
- a controller communicatively coupled to the generator, the controller comprising at least one processor and a plurality of modules configured to perform a plurality of operations, the plurality of operations comprising:
  - determining a non deliverable component and a deliverable component of a total power output of the generator,
  - determining, via a compensation module of the controller, a first control signal based, at least in part, on the non deliverable component, the first control signal being configured to establish a modified rotor current set point,
  - determining, via a buffer control module of the controller, a buffer control signal for a DC energy buffer based, at least in part, on the non deliverable component, the DC energy buffer being operably coupled between a line side converter and a rotor side converter of the power converter, wherein determining the buffer control signal further comprises:
    - filtering, via a conditioning module of the buffer control module, the non deliverable component; and
    - applying, via the conditioning module, at least one limit to the buffer control signal based on a maximum rating or a minimum rating of a component of the power generating asset,
  - precluding delivery of the non deliverable component to an electrical grid by delivering the non deliverable component to the DC energy buffer via the line side converter in response to the first control signal and the buffer control signal, and
  - delivering the deliverable component of the total power output of the generator to the electrical grid.

16. The system of claim 15, wherein the non deliverable component comprises a portion of the total power output of the generator which exceeds an active power delivery limit, and wherein the plurality of operations further comprise:
- determining the first control signal and the buffer control signal simultaneously.

17. The system of claim 15, wherein the power generating asset is configured as a grid forming power generating asset and wherein the first control signal is an angle command modifier configured to alter a desired voltage angle command so as to develop a desired change in a stator power output, and wherein determining the first control signal further comprises:
- receiving, via the compensation module, a stator voltage magnitude feedback and a synthesized voltage magnitude command;
- determining, via the compensation module, a quotient of a product of the non deliverable component and a reactance divided by a product of the stator voltage magnitude feedback and the synthesized voltage magnitude command; and
- determining, via the compensation module, the first control signal as an arcsine of the quotient.

18. The system of claim 17, wherein the buffer control module further comprises a conditioning module, and wherein determining the buffer control signal further comprises:
- applying, via the conditioning module, a dynamic gain to the non-deliverable component to compensate for an inherent transfer function between the first control signal and the change in stator active power output.

19. The system of claim 15, wherein the DC energy buffer is one of a resistive element or an energy storage device.

* * * * *